United States Patent
Corbett et al.

(10) Patent No.: US 7,203,892 B2
(45) Date of Patent: Apr. 10, 2007

(54) ROW-DIAGONAL PARITY TECHNIQUE FOR ENABLING EFFICIENT RECOVERY FROM DOUBLE FAILURES IN A STORAGE ARRAY

(75) Inventors: Peter F. Corbett, Lexington, MA (US); Steven R. Kleiman, Los Altos, CA (US); Robert M. English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 11/303,788

(22) Filed: Dec. 16, 2005

(65) Prior Publication Data

US 2006/0107135 A1 May 18, 2006

Related U.S. Application Data

(63) Continuation of application No. 10/035,607, filed on Dec. 28, 2001, now Pat. No. 6,993,701.

(51) Int. Cl.
*G11C 29/00* (2006.01)
(52) U.S. Cl. ..................................... 714/770
(58) Field of Classification Search ................ 714/718, 714/763, 770, 6, 7; 711/114
See application file for complete search history.

(56) References Cited

U.S. PATENT DOCUMENTS

| | | | |
|---|---|---|---|
| 3,876,978 A | 4/1975 | Bossen et al. | |
| 4,092,732 A | 5/1978 | Ouchi | |
| 4,201,976 A | 5/1980 | Patel | |
| 4,205,324 A | 5/1980 | Patel | |
| 4,375,100 A | 2/1983 | Tsuji et al. | |
| 4,467,421 A | 8/1984 | White | |
| 4,517,663 A | 5/1985 | Imazeki et al. | |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |
| 4,761,785 A | 8/1988 | Clark et al. | |
| 4,775,978 A | 10/1988 | Hartness | |
| 4,796,260 A | 1/1989 | Schilling et al. | |
| 4,817,035 A | 3/1989 | Timsit | |
| 4,825,403 A | 4/1989 | Gershenson et al. | |
| 4,837,680 A | 6/1989 | Crockett et al. | |

(Continued)

OTHER PUBLICATIONS

Blaum M et al. "Evenodd: An Optimal Scheme for Tolerating Double Disk Failure in RAID Architectures" Computer Architectures News, Association for Computing Machinery, New York, US, vol. 22, No. XP000450355, Apr. 1, 1994.

(Continued)

*Primary Examiner*—James C Kerveros
(74) *Attorney, Agent, or Firm*—Cesari & McKenna, LLP (57) ABSTRACT

A "row-diagonal" (R-D) parity technique reduces overhead of computing diagonal parity for a storage array adapted to enable efficient recovery from the concurrent failure of two storage devices in the array. The diagonal parity is computed along diagonal parity sets that collectively span all data disks and a row parity disk of the array. The parity for all of the diagonal parity sets except one is stored on the diagonal parity disk. The R-D parity technique provides a uniform stripe depth and an optimal amount of parity information.

41 Claims, 6 Drawing Sheets

U.S. PATENT DOCUMENTS

| | | | |
|---|---|---|---|
| 4,847,842 | A | 7/1989 | Schilling |
| 4,849,929 | A | 7/1989 | Timsit |
| 4,849,974 | A | 7/1989 | Schilling et al. |
| 4,849,976 | A | 7/1989 | Schillling et al. |
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,274,799 | A | 12/1993 | Brant et al. |
| 5,305,326 | A | 4/1994 | Solomon et al. |
| 5,351,246 | A | 9/1994 | Blaum et al. |
| 5,410,667 | A | 4/1995 | Belsan et al. |
| 5,537,567 | A | 7/1996 | Galbraith et al. |
| 5,579,475 | A * | 11/1996 | Blaum et al. .............. 714/7 |
| 5,623,595 | A | 4/1997 | Bailey |
| 5,805,788 | A | 9/1998 | Johnson |
| 5,812,753 | A | 9/1998 | Chiariotti |
| 5,819,292 | A | 10/1998 | Hitz et al. |
| 5,862,158 | A | 1/1999 | Baylor et al. |
| 5,884,098 | A | 3/1999 | Mason, Jr. |
| 5,948,110 | A | 9/1999 | Hitz et al. |
| 5,950,225 | A | 9/1999 | Kleiman |
| 5,963,962 | A | 10/1999 | Hitz et al. |
| 6,038,570 | A | 3/2000 | Hitz et al. |
| 6,092,215 | A | 7/2000 | Hodges et al. |
| 6,138,125 | A | 10/2000 | DeMoss |
| 6,138,126 | A | 10/2000 | Hitz et al. |
| 6,138,201 | A | 10/2000 | Rebalski |
| 6,158,017 | A | 12/2000 | Han et al. |
| 6,223,300 | B1 | 4/2001 | Gotoh |
| 6,247,157 | B1 | 6/2001 | Edirisooriya |
| 6,289,356 | B1 | 9/2001 | Hitz et al. |
| 6,532,548 | B1 | 3/2003 | Hughes |
| 6,581,185 | B1 | 6/2003 | Hughes |

OTHER PUBLICATIONS

"Limited Distributed DASD Checksum, A RADI Hybrid" IBW Technical Disclosure Bulletin, IBM Corp. New York, US, vol. 35, No. 4A, XP000314813, Sep. 1, 1992.
Examiner Absalom, R., European Search Report for Application No. 02258872, May 8, 2006.
U.S. Appl. No. 10/035,603, filed Dec. 28, 2001, Robert English et al.
Anvin, Peter H, "*The Mathematics of RAID 6*," Dec. 2004.
Auspex 4Front NS2000, System Architecture, Network-Attached Storage For a New Millennium, Auspex Engineering Technical Report 24, Jan. 1999.
Bestavros, Azer, et al., *Reliability and Performance of Parallel Disks*, Technical Memorandum 45312-891206-01TM, AT&T, Bell Laboratories, Department 45312, Holmdel, NJ, Dec. 1989.
Bitton, DINA, *Disk Shadowing*, Proceedings of the 14th VLDB Conference, LA, CA (1988).
Bultman, David L., *High Performance SCSI Using Parallel Drive Technology*, In Proc. BUSCON Conf., pp. 40-44, Anaheim, CA, Feb. 1988.
Chen, Peter et al., *Two Papers on RAIDs*. Technical Report, CSD-88-479, Computer Science Division, Electrical Engineering and Computer Sciences, University of California at Berkeley (1988).
Chen, Peter M., et al., *An Evaluation of Redundant Arrays of Disks Using an Amdahl 5890*, Performance Evaluation, pp. 74-85, 1990—check to see if exact same copy as one in WAFL.
Chen, Peter M.., et al, Maximizing Performance in a Striped Disk Array, Proc. 1990 *ACM SIGARCH 17th Intern.* Symp. on Comp. Arch., Seattle, WA, May 1990, pp. 322-331.
Chen, Peter M., et al., *RAID:High Performance, Reliable Secondary Storage*, ACM Computing Surveys, 26(2):145-185, Jun. 1994.
Chervenak, Ann L., *Performance Measurement of the First RAID Prototype*, Technical Report UCB/CSD 90/574, Computer Science Division (EECS), University of California, Berkeley, May 1990.
Copeland, George, et al., "*A Comparision of High-Availability Media Recovery techniques,*" in Proc. ACM-SIGMOD Int. Conf. Management of Data, 1989.
Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.
EVANS *The Tip of the Iceberg:RAMAC Virtual Array—Part 1*, Technical Support, Mar. 1997, pp. 1-4.
Gibson, Garth A., et al., *Coding Techniques for Handling Failures in Large Disk Arrays*, Technical Report UCB/CSD 88/477, Computer Science Division, University of California, (Jul. 1988).
Gibson, Garth A., et al., *Failure Correction Techniques for Large Disk Arrays*, In Proceedings Architectural Support for Programming Languages and Operating Systems, Boston, Apr. 1989, pp. 123-132.
Gibson, Garth A., et al., *Strategic Directions in Storage I/O Issues in Large-Scale Computing*, ACM Computing Survey, 28(4):779-93, Dec. 1996.
Goldick, Jonathan S., et al., *Multi-resident AFS: An Adventure in Mass Storage*, In Proceedings of the 1995 USENIX Technical Conference, pp. 47-58, Jan. 1995.
Graham, Susan L., et al., *Massive Information Storage, Management, and Use*, (NSF Institutional Infrastructure Proposal), Technical Report No. UCB/CSD 89/493, Jan. 1989.
Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.
Grimes, DW Martinez, *Two Dimensional Parity Error Correction Procedure*, IBM Technical Disclosure Bulletin 2686-2689, Oct. 1982.
Grimes, DW Martinez, *Vertical Parity Generator for Two Dimensional Parity*, IBM Technical Disclosure Bulletin 2682-2685, Oct. 1982.
Hellerstein, Lisa, et al,. *Coding Techniques for Handling Failures in Large Disk Arrays*, In Algorithmica vol. 2, Nr. 3, 182-208 (1994).
Hughes, James, et al., *High Performance RAIT*, Tenth NASA Goddard Conference on Mass Storage Systems and Technologies and Nineteenth IEEE Symposium on Mass Storage Systems, Adelphi, Maryland, USA, Apr. 2002.
Johnson, Theodore, et al, *Tape Group Parity Protection*, IEEE Symposium on Mass Storage, pp. 72-79, Mar. 1999.
Katz, Randy H. et al., *Disk System Architectures for High Performance Computing*, undated.
Kent, Jack et al., Optimizing Shadow Recovery Algorithms, *IEEE Transactions on Software Engineering*, 14(2):155-168, Feb. 1988.
Kim, Michelle Y., *Synchronized Disk Interleaving*, IEEE Transactions on Computers, C-35(11):978-988, Nov. 1986.
Kim, Michelle, et al., *Asynchronous Disk Interleaving Approximating Access Delays*, IEEE Transactions on Computers, vol. 40, No. 7, Jul. 1991, pp. 801-810.
Lawlor, F. D., *Efficient Mass Storage Parity Recovery Mechanism*, IBM Technical Disclosure Bulletin 24(2):986-987, Jul. 1981.
Lee, Edward K., et al., *RAID-II: A Scalable Storage Architecture for High-Bandwidth Network File Service*, Technical Report UCB/CSD 92/672, (Feb. 1992).

Li, Don, et al., *Authors' Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142, IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

STORAGESUITE "Performance Without Compromise: The Virtual Storage Architecture," catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al, *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14$^{th}$ VLDB Conference, LA, CA (1988).

Tanabe, Takaya, et al., *Redundant Optical Storage System Using DVD-RAM Library*, IEEE Symposium on Mass Storage, pp. 80-87, Mar. 1999.

TEKROM—"About RAID 6".

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

David Hitz et al. TR3002 File System Design for a NFS File Server Appliance published by Network Appliance, Inc.

Davis A. Patterson, Garth Gibson and Randy H. Katz, A Case of Redundant Arrays of Inexpensive Disks (RAIDS), Proceedings of ACM SiGMOD Conference on the Management of Data, pp. 109-116, 1988.

Mario Blaum, Jim Brady, Jehoshua Bruck and Jai Menon, Evenodd: An Efficient Scheme for Tolerating Double Disk Failures in RAID Architectures, IEEE Transactions on Computers, vol. 44, No. 2, Feb. 1995, pp. 192-202.

\* cited by examiner

| DATA DISK 0 | DATA DISK 1 | DATA DISK 2 | DATA DISK 3 | DATA DISK 4 | ROW PARITY DISK | DIAGONAL PARITY DISK |
|---|---|---|---|---|---|---|
| D04 | D05 | D06 | D07 | D0X | P0 | P4X |
| D15 | D16 | D17 | D1X | D14 | P1 | P5X |
| D26 | D27 | D2X | D24 | D25 | P2 | P6X |
| D37 | D3X | D34 | D35 | D36 | P3 | P7X |

|  | D0 | D1 | D2 | D3 | RP | DP |
|---|---|---|---|---|---|---|
| | $D_{0,4}$ | $D_{0,5}$ | $D_{0,6}$ | $D_{0,7}$ | $P_{0,8}$ | $P_4$ |
| | $D_{1,5}$ | $D_{1,6}$ | $D_{1,7}$ | $D_{1,8}$ | $P_{1,4}$ | $P_5$ |
| | $D_{2,6}$ | $D_{2,7}$ | $D_{2,8}$ | $D_{2,4}$ | $P_{2,5}$ | $P_6$ |
| | $D_{3,7}$ | $D_{3,8}$ | $D_{3,4}$ | $D_{3,5}$ | $P_{3,6}$ | $P_7$ |

ROW-DIAGONAL PARITY TECHNIQUE FOR ENABLING EFFICIENT RECOVERY FROM DOUBLE FAILURES IN A STORAGE ARRAY

CROSS-REFERENCE TO RELATED APPLICATION

The present invention is related to the following commonly assigned U.S. patent application Ser. No. 10/035,603 filed on Dec. 28, 2001. now issued as U.S. Pat. No. 7,073,115, issued on Jul. 4, 2006, titled, Correcting Multiple Block Data Loss in a Storage Array Using a Combination of a Single Diagonal Parity Group and Multiple Row Parity Groups, which was filed on even date herewith and which application is hereby incorporated by reference as though fully set forth herein.

CONTINUATION INFORMATION

This application for United States Patent is a continuation of U. S. patent application Ser. No. 10/035,607 filed on Dec. 28, 2001 now issued as U.S. Pat. No. 6,993,701 on Jan. 31. 2006.

FIELD OF THE INVENTION

The present invention relates to arrays of storage systems and, more specifically, to a technique for efficiently reconstructing any one or combination of two failing storage devices of a storage array.

BACKGROUND OF THE INVENTION

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD).

The disks within a storage system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In the operation of a disk array, it is anticipated that a disk can fail. A goal of a high performance storage system is to make the mean time to data loss (MTTDL) as long as possible, preferably much longer than the expected service life of the system. Data can be lost when one or more disks fail, making it impossible to recover data from the device. Typical schemes to avoid loss of data include mirroring, backup and parity protection. Mirroring is an expensive solution in terms of consumption of storage resources, such as disks. Backup does not protect data modified since the backup was created. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

As used herein, the term "encoding" means the computation of a redundancy value over a predetermined subset of data blocks, whereas the term "decoding" means the reconstruction of a data or parity block by the same process as the redundancy computation using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

Parity schemes generally provide protection against a single disk failure within a parity group. These schemes can also protect against multiple disk failures as long as each failure occurs within a different parity group. However, if two disks fail concurrently within a parity group, then an unrecoverable loss of data is suffered. Failure of two disks concurrently within a parity group is a fairly common occurrence, particularly because disks "wear out" and because of environmental factors with respect to the operation of the disks. In this context, the failure of two disks concurrently within a parity group is referred to as a "double failure".

A double failure typically arises as a result of a failure of one disk and a subsequent failure of another disk while attempting to recover from the first failure. The recovery or reconstruction time is dependent upon the level of activity of the storage system. That is, during reconstruction of a failed disk, it is possible that the storage system remain "online" and continue to serve requests (from clients or users) to access (i.e., read and/or write) data. If the storage system is busy serving requests, the elapsed time for reconstruction increases. The reconstruction process time also increases as the size and number of disks in the storage system increases, as all of the surviving disks must be read to reconstruct the lost data. Moreover, the double disk failure rate is proportional to the square of the number of disks in a parity group. However, having small parity groups is expensive, as each parity group requires an entire disk devoted to redundant data.

Another failure mode of disks is media read errors, wherein a single block or sector of a disk cannot be read. The unreadable data can be reconstructed if parity is maintained in the storage array. However, if one disk has already failed, then a media read error on another disk in the array will result in lost data. This is a second form of double failure.

Accordingly, it is desirable to provide a technique that withstands double failures. This would allow construction of larger disk systems with larger parity groups, while ensuring that even if reconstruction after a single disk failure takes a long time (e.g., a number of hours), the system can survive a second failure. Such a technique would further allow relaxation of certain design constraints on the storage system. For example, the storage system could use lower cost disks and still maintain a high MTTDL. Lower cost disks typically have a shorter lifetime, and possibly a higher failure rate during their lifetime, than higher cost disks. Therefore, use of such disks is more acceptable if the system can withstand double disk failures within a parity group.

It can easily be shown that the minimum amount of redundant information required to correct a double failure is two units. Therefore, the minimum number of parity disks that can be added to the data disks is two. This is true whether the parity is distributed across the disks or concentrated on the two additional disks.

A known double failure correcting parity scheme is an EVENODD XOR-based technique that allows a serial reconstruction of lost (failed) disks. EVENODD parity requires exactly two disks worth of redundant data, which is optimal. According to this parity technique, all disk blocks belong to two parity sets, one a typical RAID-4 style XOR computed across all the data disks and the other computed along a set of diagonally adjacent disk blocks. The diagonal parity sets contain blocks from all but one of the data is disks. For n data disks, there are n–1 rows of blocks in a stripe. Each block is on one diagonal and there are n diagonals, each n–1 blocks in length. Notably, the EVENODD scheme only works if n is a prime number. The EVENODD technique is disclosed in an article of IEEE Transactions on Computers, Vol. 44, No. 2, titled *EVENODD: An Efficient Scheme for Tolerating Double Disk Failures in RAID Architectures*, by Blaum et al, February, 1995. A variant of EVENODD is disclosed in U.S. Pat. No. 5,579,475, titled *Method and Means for Encoding and Rebuilding the Data Contents of up to Two Unavailable DASDs in a DASD Array using Simple Non-Recursive Diagonal and Row Parity*, by Blaum et al., issued on Nov. 26, 1996. The above-mentioned article and patent are hereby incorporated by reference as though fully set forth herein.

The EVENODD technique utilizes a total of p+2 disks, where p is a prime number and p disks contain data, with the remaining two disks containing parity information. One of the parity disks contains row parity blocks. Row parity is calculated as the XOR of all the data blocks that are at the same position in each of the data disks. The other parity disk contains diagonal parity blocks. Diagonal parity is constructed from p–1 data blocks that are arranged in a diagonal pattern on the data disks. The blocks are grouped into stripes of p–1 rows. This does not affect the assignment of data blocks to row parity sets. However, diagonals are constructed in a pattern such that all of their blocks are in the same stripe of blocks. This means that most diagonals "wrap around" within the stripe, as they go from disk to disk.

Specifically, in an array of n×(n–1) data blocks, there are exactly n diagonals each of length n–1, if the diagonals "wrap around" at the edges of the array. The key to reconstruction of the EVENODD parity arrangement is that each diagonal parity set contains no information from one of the data disks. However, there is one more diagonal than there are blocks to store the parity blocks for the diagonals. That is, the EVENODD parity arrangement results in a diagonal parity set that does not have an independent parity block. To accommodate this extra "missing" parity block, the EVENODD arrangement XOR's the parity result of one distinguished diagonal into the parity blocks for each of the other diagonals.

Figure 1:
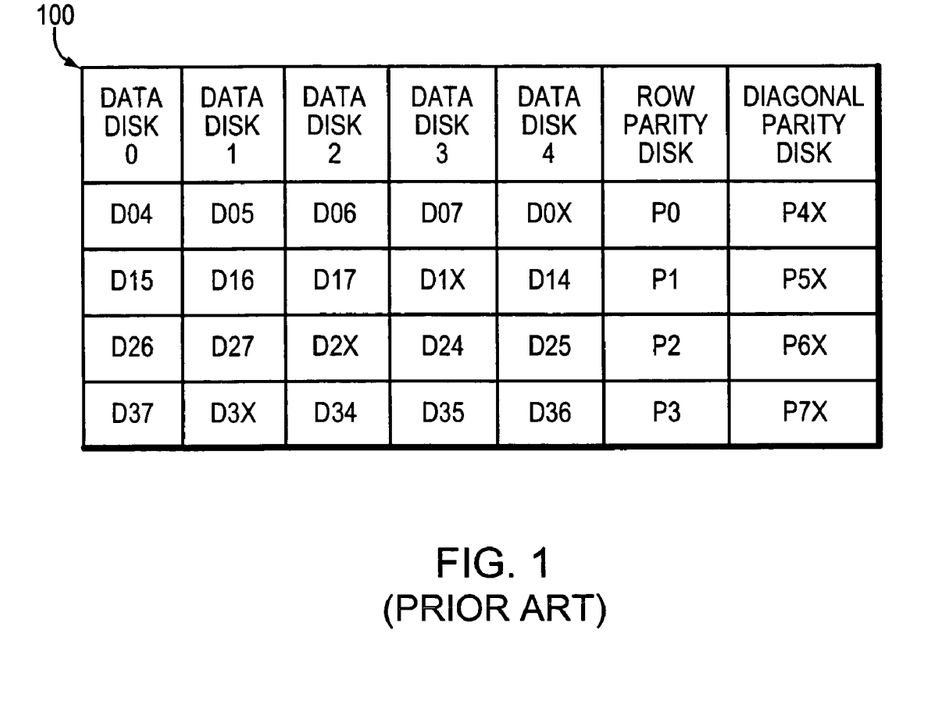
FIG. 1 is a schematic block diagram of a prior art disk array that is configured in accordance with a conventional EVENODD parity arrangement.

FIG. 1 is a schematic block diagram of a prior art disk array 100 that is configured in accordance with the conventional EVENODD parity arrangement. Each data block Dab belongs to parity sets a and b, where the parity block for each parity set is denoted Pa. Note that for one distinguished diagonal (X), there is no corresponding parity block stored. This is where the EVENODD property arises. In order to allow reconstruction from two failures, each data disk must not contribute to at least one diagonal parity set. By employing a rectangular array of n×(n–1) data blocks, the diagonal parity sets have n–1 data block members. Yet, as noted, such an arrangement does not have a location for storing the parity block for all the diagonals. Therefore, the parity of the extra (missing) diagonal parity block (X) is recorded by XOR'ing that diagonal parity into the parity of each of the other diagonal parity blocks. Specifically, the parity of the missing diagonal parity set is XOR'd into each of the diagonal parity blocks P4 through P7 such that those blocks are denoted P4X–P7X.

For reconstruction from the failure of two data disks, the parity of the diagonal that does not have a parity block is initially recomputed by XOR'ing all of the parity blocks. For example, the sum of all the row parities is the sum of all the data blocks. The sum of all the diagonal parities is the sum of all the data blocks minus the sum of the missing diagonal parity block. Therefore, the XOR of all parity blocks is equivalent to the sum of all the blocks (the row parity sum) minus the sum of all the blocks except the missing diagonal, which is just a parity of the missing diagonal. Actually, n–1 copies of the missing diagonal parity are added into the result, one for each diagonal parity block. Since n is a prime number greater than two, n–1 is even, resulting in the XOR of a block with itself an even number of times, which results in a zero block. Accordingly, the sum of the diagonal parity blocks with the additional missing parity added to each is equal to the sum of the diagonal parity blocks without the additional diagonal parity.

Next, the missing diagonal parity is subtracted from each of the diagonal parity blocks. After two data disks fail, there are at least two diagonal parity sets that are missing only one block. The missing blocks from each of those parity sets can be reconstructed, even if one of the sets is the diagonal for which there is not a parity block. Once those blocks are reconstructed, all but one member of two of the row parity sets are available. This allows reconstruction of the missing members of those rows. This reconstruction occurs on other diagonals, which provides enough information to reconstruct the last missing blocks on those diagonals. The pattern of reconstructing alternately using row then diagonal parity continues until all missing blocks have been reconstructed.

Since n is prime, a cycle is not formed in the reconstruction until all diagonals have been encountered, hence all the missing data blocks have been reconstructed. If n were not prime, this would not be the case. If both parity disks are lost, a simple reconstruction of parity from data can be performed. If a data disk and the diagonal parity disk are lost, a simple RAID-4 style reconstruction of the data disk is performed using row parity followed by reconstruction of the diagonal parity disk. If a data disk and the row parity disk are lost, then one diagonal parity may be computed. Since all diagonals have the same parity, the missing block on each diagonal can subsequently be computed.

Since each data block is a member of a diagonal parity set, when two data disks are lost (a double failure), there are two parity sets that have lost only one member. Each disk has a diagonal parity set that is not represented on that disk. Accordingly, for a double failure, there are two parity sets that can be reconstructed. EVENODD also allows reconstruction from failures of both parity disks or from any combination of one data disk and one parity disk failure. The technique also allows reconstruction from any single disk failure.

Although the EVENODD technique is optimal in terms of the amount of parity information, the amount of computation required for both encoding and decoding is only asymptotically optimal. This is because of the extra computation required to add the missing diagonal parity into each of the diagonal parity blocks. That is, the p−1 blocks in a stripe are not enough to hold the p parity blocks generated from the p diagonals. To overcome this, the EVENODD technique requires that the parity of one of the diagonals be XOR'd into the parity blocks of all the other diagonals, thereby increasing computational overhead.

In general, all diagonal parity blocks must be updated for any small write operation to a data block along the diagonal that has no direct parity block. Extra computation is also needed for a large write operation. As used herein, a "large-write" operation involves rewriting of all the blocks of a stripe, whereas a "small-write" operation involves modification of at least one data block and its associated parity.

SUMMARY OF THE INVENTION

The present invention comprises a "row-diagonal" (R-D) parity technique that reduces overhead of computing diagonal parity for a storage array adapted to enable efficient recovery from the concurrent failure of two storage devices in the array. The R-D parity technique is preferably used in an array comprising a number n of storage devices, such as disks, including a row parity disk and a diagonal parity disk, wherein n=p+1 and p is a prime number. The disks are divided into blocks and the blocks are organized into stripes, wherein each stripe comprises n−2 rows. The blocks of the rows selected to form a stripe are typically contiguous on each disk, although this not a requirement of the invention. The diagonal parity disk stores parity information computed along diagonal parity sets ("diagonals") of the array. The blocks in the stripe are organized into n−1 diagonals, each of which contains n−2 blocks from the data and row parity disks, and all but one of which stores its parity in a block on the diagonal parity disk. As a result, the novel R-D parity technique provides a uniform stripe depth and an amount of parity information equal to two disks worth, which is the minimum amount required to allow reconstruction from any two disk failures.

In accordance with the invention, the R-D parity technique involves the computation of row parity across each of the rows of data disks in the array, and thereafter, does not distinguish between the row parity and data blocks when computing the diagonal parity stored on the diagonal parity disk. That is, the diagonal parity is computed along diagonals that collectively span all the data disks and the row parity disk. Moreover, the parity for all of the diagonals except one is stored on the diagonal parity disk. In other words, the diagonal parity disk contains parity blocks for each of the diagonals of a stripe except one. Yet, even though the parity for one of the diagonals is not stored (or computed), the inventive technique provides sufficient parity information to recover from any two concurrent disk failures in the array.

Advantageously, the inventive technique minimizes the computation load to compute parity stored in the array during failure-free operation. The technique also minimizes the overhead of parity computation, and requires less computation compared to conventional schemes, such as EVENODD, for a given number of data disks. The inventive R-D parity technique speeds recovery by minimizing the total amount of computation that must be done to recover missing data. In addition, since the invention may be implemented using a concentrated parity technique, where row parity blocks are all stored on the same disk, data disks may be incrementally added to the array without reformatting or recalculating the existing parity information. The only restriction to the addition of data disks to the array is that the maximum number of disks that can be used in the array must be decided beforehand (a priori). This restriction is due to the use of diagonals and their lengths depending upon the stripe depth. The difference between the number of actual disks present and the maximum number of disks in the array is filled with "imaginary" disks that contain only zero-valued data.

It is also possible to implement the invention using a distributed parity arrangement for the row parity placement. For example, the invention could be implemented by adding a single diagonal parity disk to a RAID-5 array that contains a prime number of disks. The invention will actually work in any arrangement of a prime number of disks that is tolerant of single disk failures by using redundancy, such as parity, within rows. In any such case, the invention is implemented by adding one disk that is dedicated for diagonal parity to the array, and computing diagonal parity using normal parity computations across diagonals defined on the disks of the original array.

The description of the invention is in terms of a concentrated parity implementation, where all the row parity is stored on a single disk.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

Figure 2:
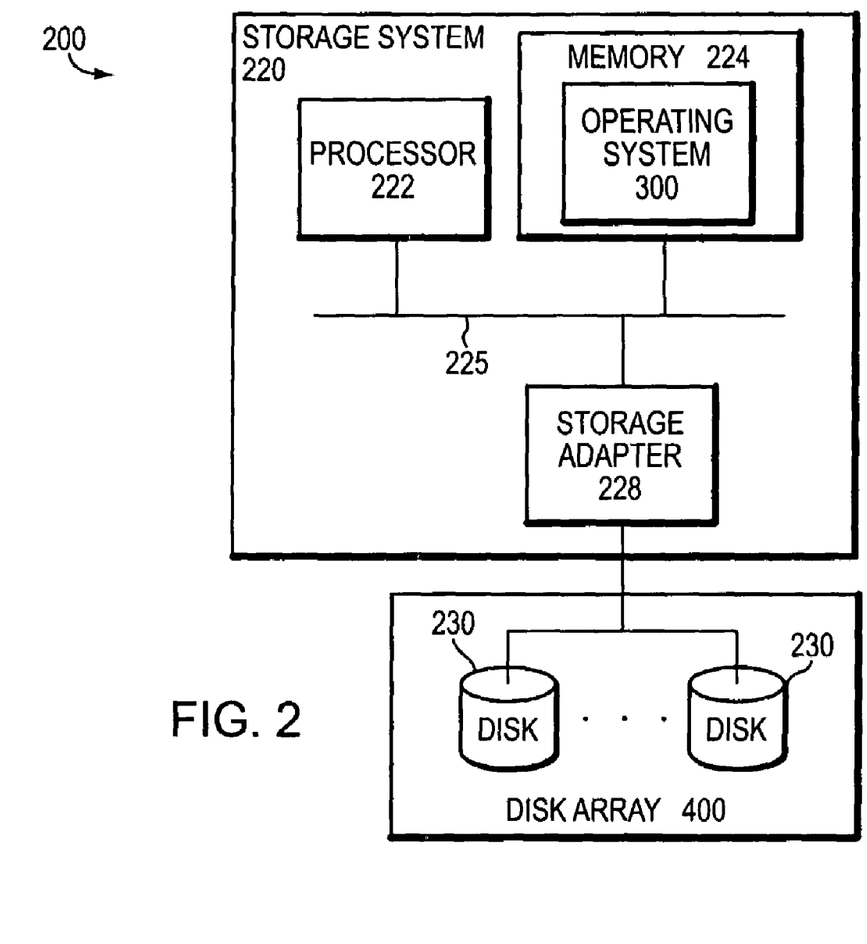
FIG. 2 is a schematic block diagram of an environment including a storage system that may be advantageously used with the present invention.

FIG. 2 is a schematic block diagram of an environment 200 including a storage system 220 that may be advantageously used with the present invention. The inventive technique described herein may apply to any type of special-purpose (e.g., file server or filer) or general-purpose computer, including a standalone computer or portion thereof, embodied as or including a storage system 220. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 220 comprises a processor 222, a memory 224 and a storage adapter 228 interconnected by a system bus 225. The memory 224 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 600, portions of which are typically resident in memory and executed by the processing elements, functionally organizes the system 220 by, inter alia, invoking storage operations executed by the storage system. It will be apparent to those skilled in the art that other processing and memory means, including various computer readable media, may be used for storing and executing program instructions pertaining to the inventive technique described herein.

The storage adapter 228 cooperates with the storage operating system 600 executing on the system 220 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 230, such as HDD and/or DASD, of array 400. The storage adapter includes input/output (I/O) interface circuitry that couples to the disks over an I/O interconnect arrangement, such as a conventional high-performance, Fibre Channel serial link topology.

Storage of information on array 400 is preferably implemented as one or more storage "volumes" that comprise a cluster of physical storage disks 230, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

The present invention comprises a "row-diagonal" (R-D) parity technique that provides double failure parity correcting recovery using row and diagonal parity in a disk array. The inventive technique is preferably implemented by a disk storage layer (shown at 624 of FIG. 6) of the storage operating system 600 to provide a method and system for constructing parity in stripes across multiple storage devices, such as disks, in a storage system. Two disks of the array are devoted entirely to parity while the remaining disks hold data. The data on the data disks is stored "in the clear", meaning it is not further encoded for storage. The contents of the array can be reconstructed entirely, without loss of data, after any one or two concurrent disk failures. The invention reduces the amount of computation of parity information that is required compared to previously known schemes, while also reducing the computation to recover from two disk failures. In addition, the invention provides a uniform stripe depth (each disk contains the same number of blocks per stripe) and an amount of parity information equal to two disks worth, which is the minimum amount required to allow reconstruction from any two disk failures.

Broadly stated, the invention comprises n storage devices, where n=p+1 and p is a prime number. The storage devices are divided into blocks, where the blocks are the same size. Within each device, n−2 blocks are arbitrarily selected and grouped to form a stripe across all the devices. Within the stripe, one device is designated to hold parity formed by selecting blocks from the other devices as input. This device is called a diagonal parity device and the parity it holds is called diagonal parity, as a result of the simplified construction technique described further herein. Within each stripe, one block is selected from each of the devices that are not the diagonal parity device in that stripe. This set of blocks is called a row. One block in the row is selected to hold parity for the row, and the remaining blocks hold data. The formulation of rows is continued until all blocks in the stripe that are not in the diagonal parity device are assigned to exactly one row. There are a total of n−2 rows.

Within each stripe, one block is selected from each of all but one of the devices that are not the diagonal parity device in that stripe, with the further restriction that no two of the selected blocks belong to the same row. This is called a diagonal parity set or "diagonal". A diagonal may be formed, for example, by numbering the data, row parity and diagonal parity devices from 0 to n−1, numbering the rows from 0 to n−3, and then assigning the block at device i, row j to diagonal (i+j+1) mod(n−1). The formation of diagonals continues until all blocks that are not on the diagonal parity device in the stripe are assigned to diagonals, with the further restriction that no two diagonals exclude all blocks from the same device. There are n−1 diagonals. Of the n−1 diagonals, n−2 diagonals are selected. The blocks in those diagonals, whether they hold data or parity, are combined to form a diagonal parity block. The n−2 diagonal parity blocks are stored in arbitrary order in the n−2 blocks in the stripe that reside on the device that holds diagonal parity in that stripe.

The invention can be implemented simply by selecting rows that contain blocks that are in the same position in each disk, selecting contiguous groups of n−1 rows to form stripes, and further selecting blocks within the stripe such that a diagonal pattern with wraparound is formed by the blocks in each diagonal. In addition, the invention can be implemented by storing all the row parity blocks in a stripe in the same device in the stripe. In a preferred embodiment, the invention can be implemented by keeping the same use of devices as row parity, diagonal parity or data devices from stripe to stripe. Alternatively, another preferred embodiment of the invention is to rotate or otherwise vary the use of the devices as row parity, diagonal parity or data devices from stripe to stripe.

Parity is generally calculated as an exclusive-OR (XOR) of data blocks to form a parity block. The XOR operation is generally performed over the same 1-bit field in each input block to produce a single corresponding bit of output. As noted, the XOR operation is equivalent to two's complement addition or subtraction of two 1-bit fields. Redundant parity information may also be computed as the sum of same-sized multi-bit fields (e.g., 8, 16, 32, 64, 128 bits) in all the inputs. For example, the equivalent of parity may be computed by adding data using two's complement addition on 32-bit fields to produce each 32 bits of redundant information. This is only the case assuming non-reliance on the fact that an XOR operation directed to the same input twice into a block produces the original content of the block, as the XOR of a block with itself produces zero. The inventive technique described herein does not rely on this aspect of XOR and, hence, may be implemented by addition and subtraction over fields wider than one bit.

It should be noted that it is common to store the direct XOR sum of data bits as the parity bit value. This is often referred to as "even parity". An alternative is to store the complement of the XOR sum of the data bits as the parity bit value; this is called "odd parity". The use of even or odd parity with respect to the invention disclosed herein is not specified. However, the algorithms referenced herein are described as if even parity is used, where such a distinction is relevant. Yet it will be apparent to those skilled in the art that odd parity may also be used in accordance with the teachings of the invention.

It will be apparent to those skilled in the art that a block (for purposes of parity computation) may or may not correspond to a file block, a database block, a disk sector or any other conveniently sized unit. There is no requirement that the block size used for parity computation have any relation to any other block sizes used in the system. However, it is expected that one or more integer number of parity blocks will fit into a unit defined to be one or more integer number of disk sectors. In many cases, some number of blocks will correspond to file system or database blocks, and will typically be of size 4 k (4096) bytes or some higher power of two bytes (e.g., 8 k, 16 k, 32 k, 64 k, 128 k, 256 k).

The illustrative system described herein preferably performs full stripe write operations. In particular, individual file blocks that are typically 4 k or 8 k bytes may be divided into smaller blocks used only for parity computation, so that full stripes of, e.g., 4 k byte sized blocks can be written to the disks of the array. When full stripes are written to disk, all parity computations may be performed in memory before the results are written to disk, thus reducing the burden of computing and updating parity on disk.

Figure 3:
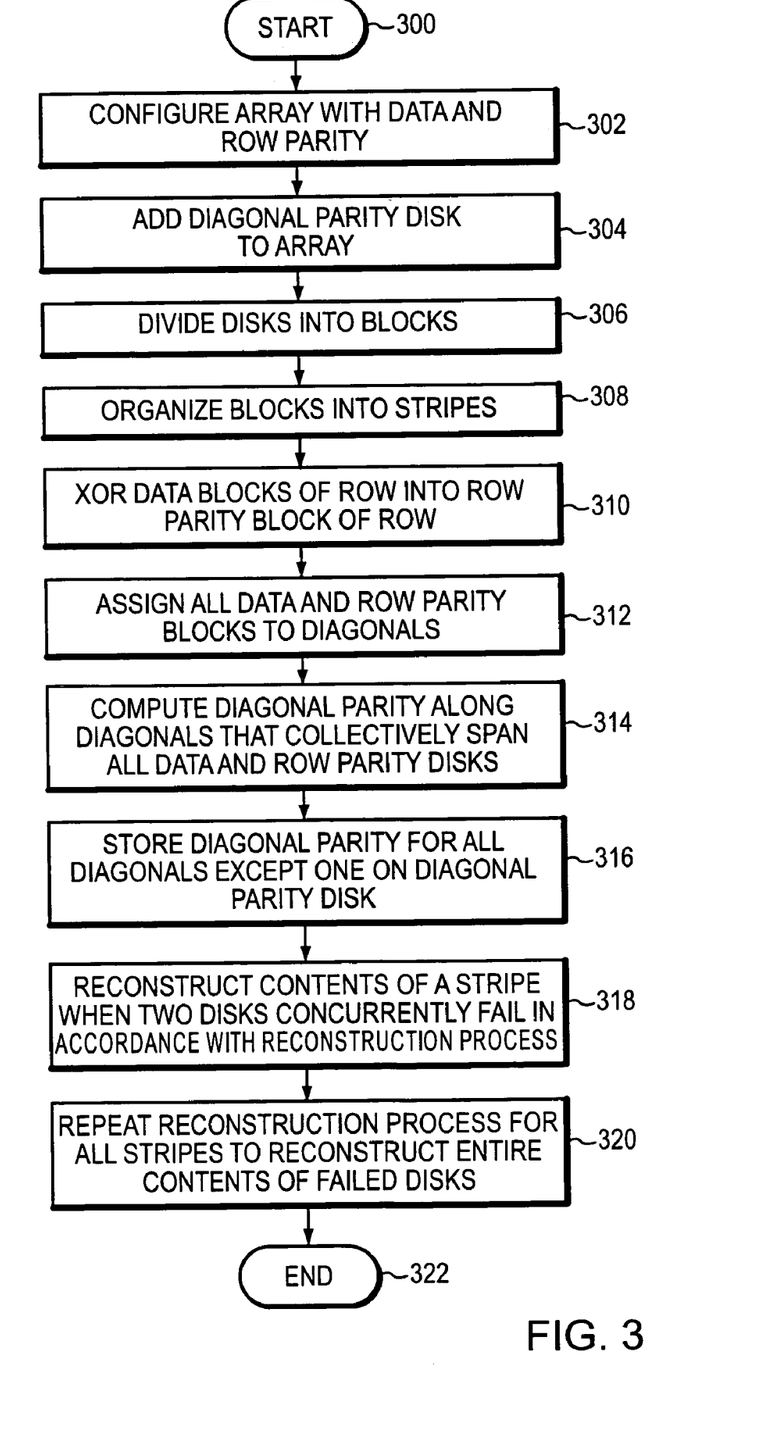
FIG. 3 is a flowchart illustrating the sequence of steps comprising a row-diagonal (R-D) parity technique of the present invention.

FIG. 3 is a flowchart illustrating the sequence of steps comprising the R-D parity technique of the present invention. The sequence starts in Step 300 and proceeds to Step 302 wherein the array is configured with a number of storage devices, such as disks, equal to a prime number p, including a row parity disk. In Step 304, an additional diagonal parity disk is included such that the entire array consists of p+1 disks. As described below, the diagonal parity disk stores diagonal parity that is computed by defining diagonal parity sets that collectively span all the data disks and the row parity disk of the array. The array therefore comprises p−1 data disks, one row parity disk and one diagonal parity disk. In Step 306, the disks are divided into blocks and, in Step 308, the blocks are organized into stripes, wherein each stripe comprises n−2 rows of blocks (with n=p+1). Each disk is preferably divided into stripes of n−2 blocks. In Step 310, each data block of a row is XOR'd into a row parity block of the row containing the XOR of all data blocks at the same position on each data disk.

All of the data blocks and the row parity blocks are then assigned to diagonals in Step 312. For an array containing p disks, the diagonals are contained within groups of p−1 rows of blocks. There are exactly p diagonals, wherein each diagonal contains one diagonal parity block comprising the XOR of exactly p−1 data and/or row parity blocks. The diagonals wrap around at the edges of the array, with each of the p diagonal sets excluding exactly one disk. Each diagonal must exclude a different disk. Within the set of p−1 rows, every disk block is on exactly one of the p diagonals. Table 1 illustrates an embodiment of an array for p=5 with the diagonals numbered from 0 to 4. The numbers in the table indicate the diagonal parity sets to which each block belongs.

TABLE 1

| 1 | 2 | 3 | 4 | 0 | 1 |
|---|---|---|---|---|---|
| 2 | 3 | 4 | 0 | 1 | 2 |
| 3 | 4 | 0 | 1 | 2 | 3 |
| 4 | 0 | 1 | 2 | 3 | 4 |

It should be noted that the positions of the columns can be permuted, as can the positions of the elements in each column, as long as no two blocks in a row belong to the same diagonal parity set, without changing the property that the array can be reconstructed from any two disk failures. Without loss of generality, it can be assumed that blocks are assigned to diagonal parity sets in a way that is substantially in accord with Table 1. Furthermore, membership of blocks in rows can be permuted.

As noted, the parity for the diagonal parity sets is stored on the diagonal parity disk. In accordance with the invention, the R-D parity technique does not distinguish between the row parity and data blocks when computing the diagonal parity stored on the diagonal parity disk. In other words, all disks of the original array can be treated equivalently such that the information stored on any one of them can be recovered from the XOR sum of all the other disks in the row parity set. The diagonal parity disk thus stores diagonal parity computed along diagonal parity sets that collectively span all the data disks and the row parity disk of the array (Step 314). It should be noted that the roles of the disks, e.g., data, row parity or diagonal parity disks, can be varied from stripe to stripe, allowing RAID-5 style distributed parity implementations.

However, there is insufficient space on the diagonal parity disk to hold all the parity information for the p diagonals defined on the p−1 rows. In particular there is only sufficient room for p−1 blocks of diagonal parity. Each data disk and the row parity disk contribute, at most, one block to a diagonal and no row contains two blocks, whether data or row parity, that are both members of the same diagonal. Although there are exactly p diagonals, within a stripe there are only p−1 diagonal parity blocks on the diagonal parity disk.

To overcome this, the diagonal parity for one of the diagonal parity sets is not stored on the diagonal parity disk (Step 316). That is, the diagonal parity disk contains parity blocks for each of the diagonals of a stripe except one. The choice of which diagonal parity block not to store is arbitrary. Since that parity is not stored, it is also not computed. Yet even though the parity for one of the diagonals is not stored, the inventive technique provides sufficient parity information to recover from any two concurrent disk failures in the array. That is, the entire contents of a stripe can be reconstructed when any two of its disks are lost in accordance with a reconstruction aspect of the present invention (Step 318). By repeating the reconstruction process for all stripes, the entire contents of the two failed disks may be reconstructed in Step 320. The sequence then ends at Step 322.

Since there is no distinction between the row parity disk and the data disks when assigning disks to diagonals, the distinction between the row parity and data disks can be ignored when dealing with recovery from diagonal parity sets. To illustrate, consider that any two data disks or any one data disk and the row parity disk are lost. A lost block of a parity set can be restored only if all other blocks that compose the parity set are available. An artifact of XOR parity is that all blocks are mathematically equivalent, whether they originally hold data or parity. For example, consider the parity construction $a \hat{\ } b \hat{\ } c = d$, wherein "^" represents an XOR operator. XORing both sides with d gives $a \hat{\ } b \hat{\ } c \hat{\ } d = 0$. Therefore, all the data disks and the row parity disk may be treated the same during reconstruction.

In each of these disks, exactly one diagonal is not represented. Accordingly, reconstruction can begin on the other disk that does not contain a member of that diagonal. Since two disks have failed, in most cases, there are two blocks that can be reconstructed immediately from diagonal parity data. This is true unless one of the diagonals that is missing only one block is the diagonal for which no parity is stored. But since at most one disk is missing data for that parity set, there is at least one block that can be reconstructed immediately. Once one or two blocks are reconstructed from diagonal parity, then the other missing block in that or those row(s) can be reconstructed from row parity, as at that point only one block is missing from the row parity sets having blocks reconstructed using diagonal parity (which does not include the diagonal parity blocks). Once those blocks are reconstructed, one or two more blocks can be reconstructed that are on the same diagonal(s) as the row blocks.

Therefore, reconstruction proceeds by a series of diagonal, then horizontal, "moves". Since p is prime, all series of horizontal then diagonal moves "hit" every row of a stripe before hitting the same row twice. Yet there is one diagonal over which no diagonal move is possible because parity is not stored for that diagonal. Without losing generality, the diagonals are numbered from 0 to p−1, and parity is computed for all but diagonal 0. Thus, no diagonal moves are possible along diagonal 0. For disks that are a given distance apart in the array, there is always a fixed sequence of diagonals that can be reconstructed ending with diagonal 0. If the disks are numbered from 0 to p−1, and wrap around among the disks is considered so that disk p−1 (the row parity disk) is adjacent to disk 0, then there are (p−1) sequences to consider. Each sequence corresponds to the reconstruction of any pair of disks separated by that distance. Table 2 illustrates sequences for, e.g., p=13:

TABLE 2

Disks 1 apart: 1 2 3 4 5 6 7 8 9 10 11 12 0
Disks 2 apart: 2 4 6 8 10 12 1 3 5 7 9 11 0
Disks 3 apart: 3 6 9 12 2 5 8 11 1 4 7 10 0
Disks 4 apart: 4 8 12 3 7 11 2 6 10 1 5 9 0
Disks 5 apart: 5 10 2 7 12 4 9 1 6 11 3 8 0
Disks 6 apart: 6 12 5 11 4 10 3 9 2 8 1 7 0
Disks 7 apart: 7 1 8 2 9 3 10 4 11 5 12 6 0
Disks 8 apart: 8 3 11 6 1 9 4 12 7 2 10 5 0
Disks 9 apart: 9 5 1 10 6 2 11 7 3 12 8 4 0
Disks 10 apart: 10 7 4 1 11 8 5 2 12 9 6 3 0
Disks 11 apart: 11 9 7 5 3 1 12 10 8 6 4 2 0
Disks 12 apart: 12 11 10 9 8 7 6 5 4 3 2 1 0

Note that the sequence for disks k apart always starts at diagonal k, and continues by incrementing the diagonal by j each time, modulo p, and ends at p, mod p=0. Note also that the first p terms of the sequence for disks k apart is the reverse of the first p terms of the sequence for disks p−k apart.

The starting position on a sequence depends on which pair of disks has failed. When the disks and diagonals are numbered according to the previous description, i.e., the disks are numbered sequentially from 0 to n−1, the rows are numbered sequentially from 0 to n−3 and block i of disk j belongs to diagonal parity set (i+j+1) mod(n−1) in each disk j that has failed, the missing diagonal is always diagonal j. Therefore, for a pair of disks separated by k, the two diagonals for which repair can begin are j and (j+k) mod n−1. Note that these two diagonals are always adjacent in the reconstruction sequence for disks k apart. Reconstruction proceeds in a sequence of diagonals determined by moving to the right from the starting point in the two sequences, for disks k apart starting at symbol (j+k) mod(n−1) and for disks p−k apart, starting at symbol j, where k<p/2. Accordingly, it is always possible to fully reconstruct if any combination of two data disks or one data disk and the row parity disk fails. If the diagonal parity disk and one other disk fail, it is a simple matter to reconstruct the other failed disk, whether it be data or row parity from the stored row parity and then to reconstruct the diagonal parity disk. As a result, the inventive R-D parity technique allows recovery from any two disk failures.

It should be noted that not all data blocks belong to a diagonal for which parity is computed. In fact, diagonal parity is computed for only (p−1)/p of the data and row parity blocks. A single block update is expensive, as row parity must be recalculated for that block as well as diagonal parity for the block. Then, when the row parity for the block is updated, the change must be added into the diagonal parity block for the row parity block as well. However, this can be simplified in systems where a stripe is one "block" wide and is composed of subblocks used only for parity computation. Here, a parity update is computed that is added to the row parity. Portions of the same parity update block are also added directly to portions of the diagonal parity block for the stripe.

Figure 4:
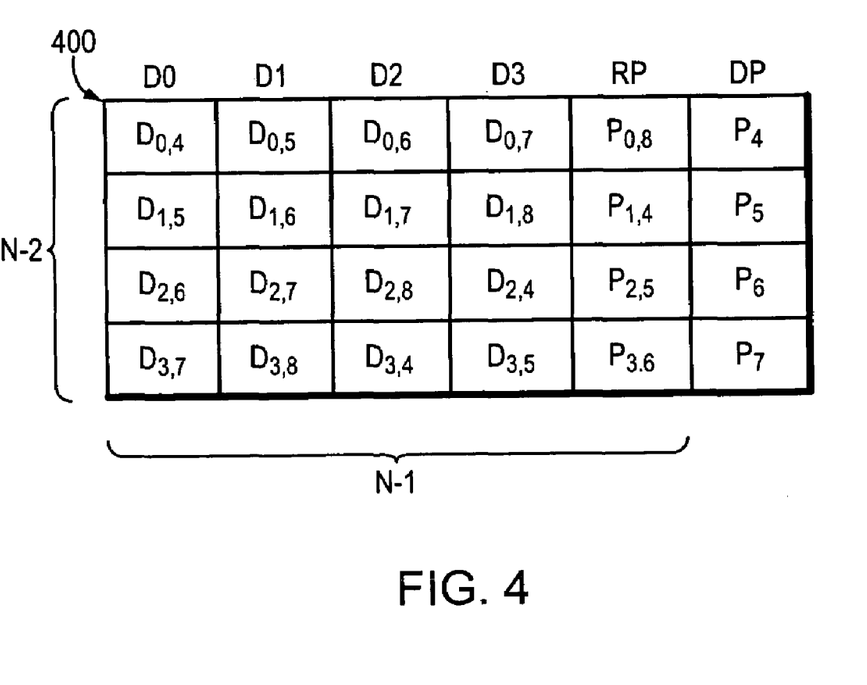
FIG. 4 is a block diagram of a disk array organized in accordance with the novel R-D parity technique.

FIG. 4 is a block diagram of a disk array 400 organized in accordance with the novel R-D parity technique of the present invention. Assume n equals the number of disks in the array, where n=p+1. The first n−2 disks (D0–3) hold data, while disk n−1 (RP) holds row parity for the data disks D0–D3 and disk n (DP) holds diagonal parity. In the illustrative embodiment, the number of disks n in the array equals 6. The disks are divided into blocks and the blocks are grouped into stripes, wherein each stripe equals n−2 (e.g., 4) rows. In addition, there are n−1 (e.g., 5) diagonals per stripe.

The data blocks and the row parity blocks are numbered such that each block belongs to a diagonal parity set and, within each row, each block belongs to a different diagonal parity set. The notation $D_{a,b}$ and $P_{a,b}$ denotes the respective contributions of data (D) and parity (P) blocks to specific row (a) and diagonal (b) parity computations. That is, the notation $D_{a,b}$ means that those data blocks belong to the row or diagonal used for purposes of computing row parity a and diagonal parity b, and $P_{a,b}$ stores the parity for row parity set a and also contributes to diagonal parity set b. For example, $P_{0,8} = D_{0,4} \char`\^ D_{0,5} \char`\^ D_{0,6} \char`\^ D_{0,7}$. The notation also includes the row parity block used for purposes of computing the diagonal parity for a particular diagonal, e.g., $P_{4,1=D0,4} \char`\^ D_{3,4} \char`\^ D_{2,4} \char`\^ P_{1,4}$. Note that each of the diagonal parity blocks stored on the diagonal parity disk contains contributions from all but one of the other disks (including the row parity disk) of the array. For example, the diagonal parity block $P_4$ has contributions from D0 ($D_{0,4}$), D2 ($D_{3,4}$), D3 ($D_{2,4}$) and RP ($P_{1,4}$), but no contribution from D1. Note also that the diagonal parity for diagonal 8 ($P_8$) is neither computed nor is it stored on the diagonal parity disk DP.

According to the invention, the diagonal parity blocks on disk DP include the row parity blocks in their XOR computation. In other words, the diagonal parity stored on the disk DP is computed not only in accordance with the contents of the data disks but also with the contents of the row parity disk. By encoding the diagonal parity blocks as shown in array 400, the system can recover from any two concurrent disk failures despite the missing diagonal parity ($P_8$). This results from the fact that the row parity blocks are factored into the computations of the diagonal parity blocks stored on the diagonal parity disk DP. In contrast, the conventional EVENODD technique does not factor the row parity blocks into the computations of the diagonal parity sets. Rather, the conventional EVENODD approach factors the missing diagonal parity block into each of the other diagonal parity blocks stored on its diagonal parity disk.

Operationally, if the diagonal parity disk and any data disk are lost, recovery is achieved by first rebuilding the data disk from row parity (e.g., in accordance with a conventional RAID-4 reconstruction technique) and then rebuilding the diagonal parity disk. Similarly, if the two parity disks are lost, recovery is achieved by first rebuilding the row parity disk from the data disks and then rebuilding the diagonal parity disk. On the other hand, losing any pair of data disks allows immediate recovery of one block from at least one and possibly two of the diagonal parity sets. From there, the system is able to recover the rest of the missing data blocks. Notably, losing the row parity disk and a data disk is exactly the same as losing two data disks, and recovery may be achieved in the same manner.

Figure 5:
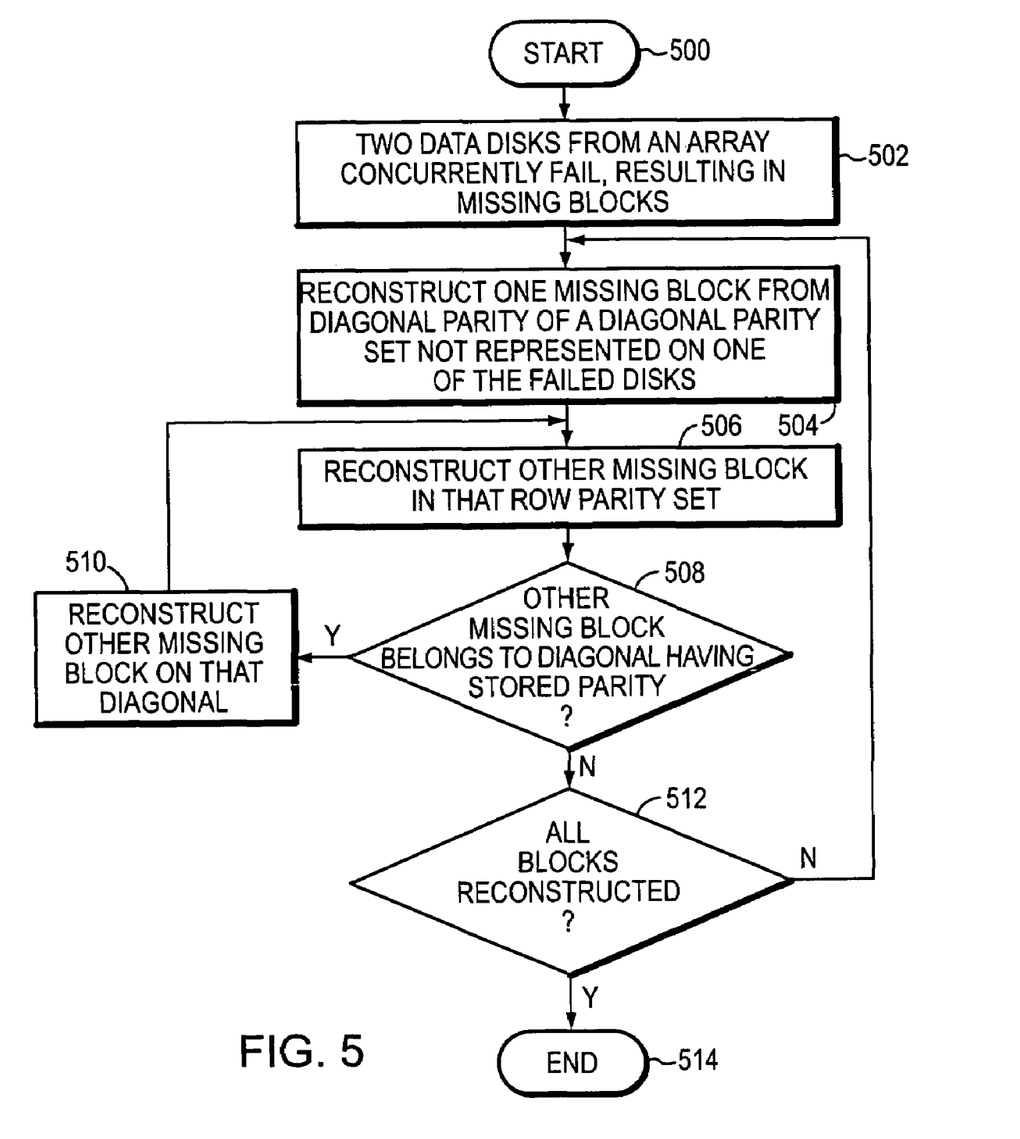
FIG. 5 is a flowchart illustrating the sequence of steps involved in a reconstruction process of the R-D parity technique according to the present invention.

FIG. 5 is a flowchart illustrating the sequence of steps involved in a recovery (reconstruction process) aspect of the novel R-D parity technique. The sequence starts at Step 500 and proceeds to Step 502 where it is assumed that two data disks (or one data disk and the row parity disk) from the array 400 are concurrently lost due to failure. As with any combination of two failed data disks, row parity cannot be immediately used to reconstruct the lost data; only diagonal parity can be used. Given the structure and organization of the array (i.e., the stripe length and stripe depth are not equal) each diagonal does not include (misses) a block from one disk. Therefore, when the two data disks are lost, two diagonals have lost only one member. In other words, two disks are lost and each of those disks is not a member of one diagonal. A diagonal parity block is stored on the DP disk for all but one diagonal; therefore, in Step 504, reconstruction of at least one, and usually two, of the missing blocks is initiated using diagonal parity.

Once a missing block is reconstructed, reconstruction of a row may be completed by reconstructing the other missing block on that row using row parity (Step 506). When that other block is reconstructed, a determination is made in Step 508 as to whether the block belongs to a diagonal for which there is stored parity. If the block belongs to a diagonal for which there is parity, the other missing block on that diagonal can be reconstructed from the other disk that is on that diagonal using diagonal parity (Step 510). That is, for all but the missing diagonal, once one block on the diagonal is reconstructed, the other can be reconstructed. The sequence then returns to Step 506 where the other missing block in that row parity set is reconstructed. However, if the block belongs to a diagonal for which there is no parity (i.e, the missing diagonal), then a determination is made in Step 512 as to whether all blocks have been reconstructed. If not, the sequence returns to Step 504 where the pattern of first reconstructing based on diagonal parity, then on row parity, continues until the last data block used in computation of the missing diagonal parity set is reached. Once all blocks have been reconstructed, the sequence ends at Step 514. The missing diagonal parity set always terminates the chain of reconstruction.

Specifically, assume adjacent data disks D0 and D1 of the array 400 are lost. D0 has no member of diagonal parity set 8 and D1 has no member of diagonal parity set 4. However, the parity for diagonal 8 is neither computed nor stored; therefore, there is only one starting point for reconstruction and that is with diagonal 4. Other conventional double-disk failure parity correcting schemes generally include two starting points for reconstruction; according to an aspect of the present invention, however, only one starting point is needed in those cases where only one is available. Since diagonal 4 is missing only one member, data block $D_{0,4}$ on D0 can be immediately reconstructed from the diagonal 4, which then enables reconstruction of data block $D_{0,5}$ on data disk D1 in accordance with the row parity information stored in parity block $P_{0,8}$ of parity disk RP.

Upon reconstructing data block $D_{0,5}$, diagonal 5 is only missing one member and that member (i.e., data block $D_{1,5}$ on D0) can be reconstructed using diagonal parity. Reconstruction of data block $D_{1,5}$ allows reconstruction of data block $D_{1,6}$ on D1 in accordance with row parity recovery using parity block $P_{1,4}$ on parity disk RP. Note that this "diagonal-row" sequence of reconstruction proceeds until the last data block ($D_{3,8}$ on D1) used in computation of the missing diagonal parity set is reached. Here, the missing diagonal parity set ($P_8$) ends the chain of reconstruction. Note also that for each diagonal, the distance (i.e., the number of disks) between the failed disks is equal to the number of rows traversed when reconstructing the lost data along the diagonal parity set. It should be further noted that there is only one chain of reconstruction, but only one block of parity set 8 is missing.

As another example, assume adjacent disks D1 and D2 are lost, thereby resulting in each diagonal parity set 4 and 5 losing one member. The lost data block contributing to the diagonal parity set 5 ($D_{0,5}$ on D1) can be immediately reconstructed, as can the lost data block contributing to diagonal parity set 4 ($D_{3,4}$ on D2). Each of these reconstructed data blocks can be used to reconstruct another data block using row parity information in accordance with the "diagonal-row" pattern described above. Note that this is an example of two, parallel reconstruction "threads" used for reconstruction of the lost data disks. The first thread proceeds to reconstruct $D_{0,5}$, $D_{0,6}$, $D_{1,6}$, $D_{1,7}$, $D_{2,7}$, $D_{2,8}$ and the second thread proceeds to reconstruct $D_{3,4}$ and $D_{3,8}$. Again, each thread terminates at the missing diagonal parity set.

Assume now that two data disks are lost but that the data disks are not adjacent. For example, assume D0 and D2 are lost, resulting in diagonal parity sets 8 and 5 missing only one member. As noted, diagonal parity set 8 does not help in the reconstruction process, so the reconstruction chain begins with a missing data block contributing to diagonal parity set 5 ($D_{1,5}$ on D0). Reconstruction of that data block enables reconstruction of data block $D_{1,7}$ on D2 utilizing row parity information stored in parity block $P_{1,4}$ on parity disk RP. Since the lost data disks are two apart, reconstruction of the lost data block contributing to the diagonal parity set 7 requires traversing two rows of the array to, i.e., $D_{3,7}$ on D0. This in turn allows reconstruction of the lost data block $D_{3,4}$ on D2 using row parity. This "diagonal-row" pattern continues in accordance with modulo p ("wrap around") arithmetic, so that the next block reconstructed is $D_{0,4}$, then $D_{0,6}$, $D_{2,6}$ and finally $D_{2,8}$.

In sum, the sequence of reconstruction can be described by listing, in order, the diagonals that can be reconstructed, starting from the first diagonal reconstructed and ending with the missing diagonal parity. For two failing disks j and j+k, separated by k, one sequence of diagonals that can be reconstructed increments by k each time and the other decrements by k each time. This is because a row reconstruction moves k disks to the right (or left), and hence also moves to the next k higher (or lower) diagonal, modulo p. In most cases, there are a plurality (e.g., at least two) parallel reconstruction threads. The exceptions are if D0, which is the disk that does not include a block of the "missing" diagonal, and any other disk other than the diagonal parity disk DP are lost. In that case, there is only a single stream of reconstructed blocks, ending with the block in the missing diagonal parity set on the other missing disk.

Figure 6:
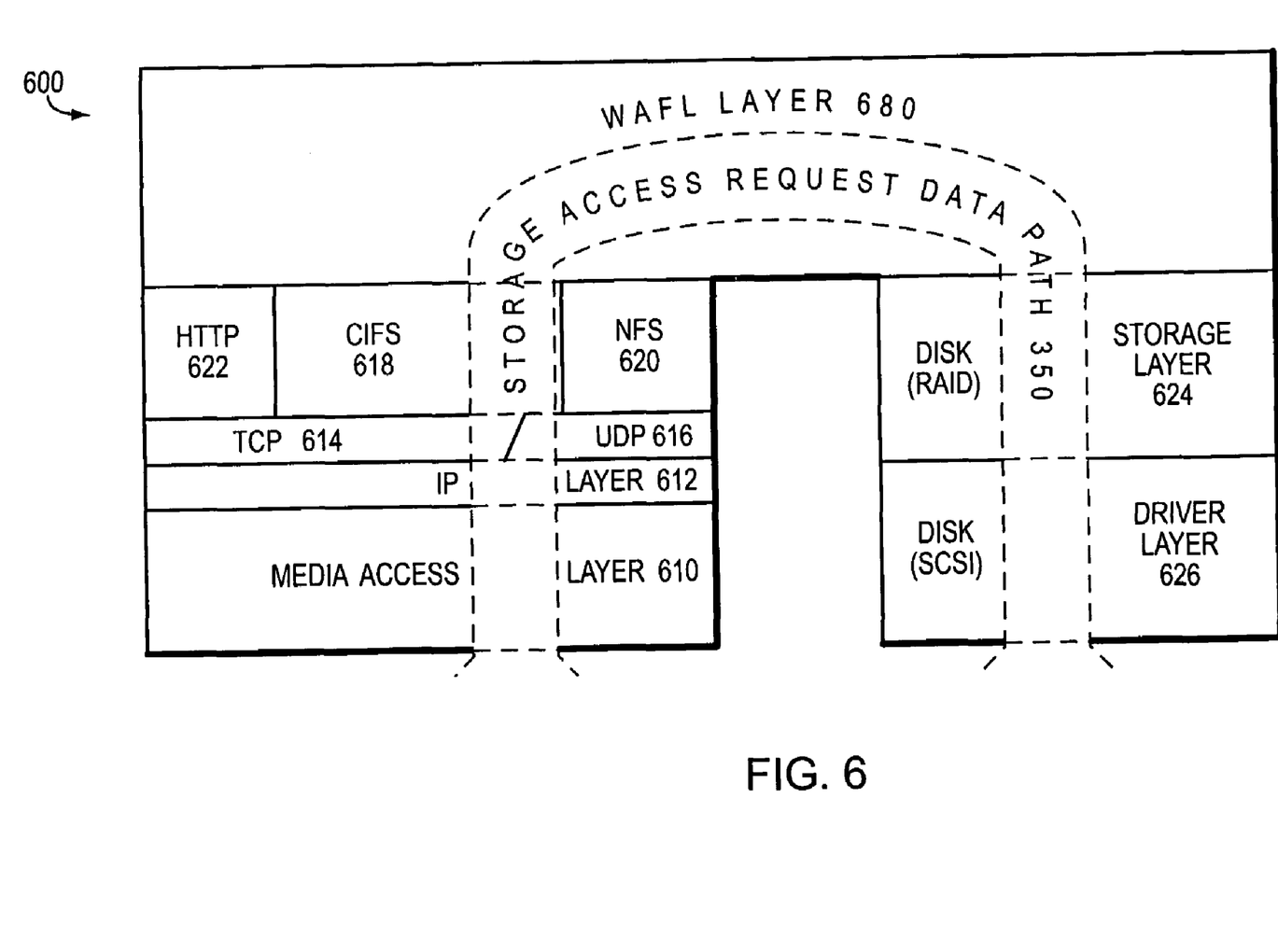
FIG. 6 is a schematic block diagram of a storage operating system that may be advantageously used with the present invention.

FIG. 6 is a schematic block diagram of the storage operating system 600 that may be advantageously used with the present invention. In the illustrative embodiment, the storage operating system is preferably the NetApp® Data ONTAP™ operating system available from Network Appliance, Inc., Sunnyvale, Calif. that implements a Write Anywhere File Layout (WAFL™) file system. As used herein, the term "storage operating system" generally refers to the computer-executable code operable to perform a storage function in a storage system, e.g., that implements file system semantics and manages data access. In this sense, the ONTAP software is an example of such a storage operating system implemented as a microkernel and including the WAFL layer to implement the WAFL file system semantics and manage data access. The storage operating system can also be implemented, for example, as an application program operating over a general-purpose operating system, such as UNIX® or Windows NT®, or as a general-purpose operating system with storage functionality or with configurable functionality, which is configured for storage applications as described herein.

The storage operating system comprises a series of software layers, including a media access layer 610 of network drivers (e.g., an Ethernet driver). The operating system further includes network protocol layers, such as the Internet Protocol (IP) layer 612 and its supporting transport mechanisms, the Transport Control Protocol (TCP) layer 614 and the User Datagram Protocol (UDP) layer 616. A file system protocol layer provides multi-protocol data access and, to that end, includes support for the Common Internet File System (CIFS) protocol 618, the Network File System (NFS) protocol 620 and the Hypertext Transfer Protocol (HTTP) protocol 622. In addition, the operating system 600 includes a disk storage layer 624 that implements a disk storage protocol, such as a RAID protocol, and a disk driver layer 626 that implements a disk access protocol such as, e.g., a Small Computer Systems Interface (SCSI) protocol. Bridging the disk software layers with the network and file system protocol layers is a WAFL layer 680 that preferably implements the WAFL file system.

It should be noted that the software "path" through the storage operating system layers described above needed to perform data storage access for a user request received at the storage system may alternatively be implemented in hardware. That is, in an alternate embodiment of the invention, the storage access request data path 650 may be implemented as logic circuitry embodied within a field programmable gate array (FPGA) or an application specific integrated circuit (ASIC). This type of hardware implementation is could increase the performance of the service provided by system 220 in response to a user request. Moreover, in another alternate embodiment of the invention, the processing elements of adapter 228 may be configured to offload some or all of the storage access operations from processor 222 to thereby increase the performance of the service provided by the storage system. It is expressly contemplated that the various processes, architectures and procedures described herein can be implemented in hardware, firmware or software.

While there has been shown and described an illustrative embodiment of a R-D parity technique that reduces overhead of computing diagonal parity for a storage array, it is to be understood that various other adaptations and modifications may be made within the spirit and scope of the invention. For example, while the invention is suitable for deployment in a concentrated parity configuration, analogous to RAID-4 where all the parity information is stored on two disks, the invention could also be applied in a distributed parity configuration, analogous to RAID-5 or other distributed parity variants. According to these latter distributed parity variants, there are two blocks of parity per row, but the location of the parity blocks shifts from disk to disk in the array in different sets of rows.

It has been seen that the invention requires a group of p−1 rows to contain a complete group of row and diagonal parity sets such that the entire group of rows is recoverable from the loss of any two disks in the row. In the illustrative embodiment, the rows in this group are adjacent rows in the disks of the disk array. It has also been seen that not all of the data disks need to be present, if the array is configured in a concentrated parity style, with all the parity information on two disks. Two parity disks are required, and they normally are accompanied by at least one data disk. However, not all of the total of p−1 data disks allowed in the array need to be present. Absent disks are treated as if they are present and contain all zeros, i.e., zero-valued data. Since this results in a null contribution to the parity values, there is no violation of the algorithms used to construct parity or to recover from failed disks.

There are some prime numbers that are particularly good choices for constructing the arrays. These are the prime numbers that are a power of two plus one, and that are smaller than the block size used to access the disks, and as large as or larger than the number of disks contemplated in an array. The first primes that are a power of two plus 1 are 5, 17 and 257. Of these, 5 is too small for many cases, as it would allow the disk array to contain at most 4 data disks. However, 17 and 257 are both good choices. The reason is because most storage systems divide disk storage into blocks that are a power of two in size, typically 4 k (4096) bytes, 8 k (8192) bytes, or some other similarly sized power of two. By having p=17 or p=257, diagonal parity is computed within groups of 16 or 256 rows, in arrays that contain up to 15 or 255 data disks respectively. Both of these are reasonable choices, because it is possible to evenly divide the data blocks, which are, for example, 4 k bytes large, into sub-blocks of 4 k/16=256 or 4 k/256=16 bytes each. Diagonal parity is computed by defining diagonals along the sub-blocks. Row parity is computed by computing parity on the entire, for example, 4 k block, in exactly the same way it would be computed in a RAID-4 or RAID-5 array without diagonal parity.

While each 4 k disk block can be divided evenly into 16 or 256 sub-blocks for the purpose of diagonal parity set computation, implementation of this approach in software or hardware requires, in the illustrative embodiment, the XOR of just one or two contiguous, non-overlapping regions of each 4 k block onto a 4 k diagonal parity block, with each region composed of one or more sub-blocks. The data block contents are XOR'd into the diagonal parity block in a shifting pattern, and the sub-block of each data block that belongs to the missing diagonal parity set is excluded from contributing to the diagonal parity block. The total computation time to add the diagonal parity data to the diagonal parity block can be comparable to the computation time to add the data block to the row parity block.

Advantageously, the invention provides double disk failure parity protection in, e.g., a RAID-4 style concentrated parity format, where all the parity information is stored on two devices, such as disks. The inventive parity technique thus enables data disks to be incrementally added to disk arrays without reformatting or recalculating the existing parity information. The invention uses a minimum amount of redundant disk space, i.e., exactly two disks per array. The invention also reduces the overhead of parity computation compared to prior art approaches, such as EVENODD, for a given number of data disks.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for enabling recovery from concurrent failure of two storage devices in a storage array, comprising:
   storing data and row parity on a plurality of storage devices, the data configured as rows of blocks on the plurality of storage devices, where a number of the plurality of storage devices is equal to a prime number greater then three;
   computing a diagonal parity set for the plurality of storage devices; and
   storing the diagonal parity set on an additional diagonal parity device, the diagonal parity device separate from the plurality of storage devices, where the plurality of storage devices combine with the separate diagonal parity device to form the storage array.

2. The method as in claim 1, further comprising:
   predetermining a total number of storage devices in the storage array as n, where n is p+1, and where p is the prime number, and the one is for the additional diagonal parity device.

3. The method as in claim 1, wherein the row parity blocks are stored on a single storage device of the plurality of storage devices.

4. The method as in claim 1, further comprising:
   configuring the plurality of storage devices so that not all first storage devices are present, and treating absent data storage devices as containing zero valued data.

5. The method as in claim 1, further comprising:
   computing row parity blocks by an encoding of data blocks that is tolerant of single device failures.

6. The method as in claim 1, further comprising:
   configuring each row to have one row parity block and one diagonal parity block.

7. The method as in claim 1, further comprising:
   placing parity blocks in different locations in different stripes from device to device.

8. The method as in claim 1, further comprising:
   implementing a row-diagonal (R-D) parity technique that computes the diagonal parity along diagonal parity sets that span the plurality of storage devices, and that stores the diagonal parity for all of the diagonal parity sets except one on the diagonal parity device.

9. The method as in claim 1, further comprising:
   invoking storage access operations to and from the array in accordance with a R-D parity technique.

10. The method as in claim 1, further comprising:
    configuring the array as a RAID system of computer storage units.

11. The method as in claim 1, further comprising:
    configuring the array as a RAID system of computer storage disks; organizing each computer storage disk into blocks; and
    organizing the blocks into stripes, the stripes extending across a plurality of the computer storage disks.

12. An apparatus for enabling recovery from concurrent failure of two storage devices in a storage array, comprising:
    means for storing data and row parity on a plurality of storage devices, the data configured as rows of blocks on the plurality of storage devices, where a number of the plurality of storage devices is equal to a prime number greater then three;
    means for computing a diagonal parity set for the plurality of storage devices; and
    means for storing the diagonal parity set on an additional diagonal parity device, the diagonal parity device separate from the plurality of storage devices, where the plurality of storage devices combine with the separate diagonal parity device to form the storage array.

13. The apparatus as in claim 12, further comprising:
    means for predetermining a total number of storage devices in the storage array as n, where n is p+1, and where p is the prime number, and the one is for the additional diagonal parity device.

14. The apparatus as in claim 12, wherein the row parity blocks are stored on a single storage device of the plurality of storage devices.

15. The apparatus as in claim 12, further comprising: means for configuring the plurality of storage devices so that not all storage devices are present, and treating absent data storage devices as containing zero valued data.

16. The apparatus as in claim 12, further comprising: means for computing row parity blocks by an encoding of data blocks that is tolerant of single device failures.

17. The apparatus as in claim 12, further comprising: means for configuring each row to have one row parity block and one diagonal parity block.

18. The apparatus as in claim 12, further comprising: means for placing parity blocks in different locations in different stripes from device to device.

19. The apparatus as in claim 12, further comprising: means for implementing a row-diagonal (R-D) parity technique that computes the diagonal parity along diagonal parity sets that span the plurality of storage devices, and that stores the diagonal parity for all of the diagonal parity sets except one on the diagonal parity device.

20. The apparatus as in claim 12, further comprising: means for invoking storage access operations to and from the array in accordance with a R-D parity technique.

21. The apparatus as in claim 12, further comprising: means for configuring the array as a RAID system of computer storage units.

22. The apparatus as in claim 12, further comprising: means for configuring the array as a RAID system of computer storage disks; means for organizing each computer storage disk into blocks; and means for organizing the blocks into stripes, the stripes extending across a plurality of the computer storage disks.

23. A system for enabling recovery from concurrent failure of two storage devices in a storage array, comprising: a plurality of storage devices to store data and row parity, the data configured as rows of blocks on the plurality of storage devices, where a number of the plurality of storage devices is equal to a prime number greater then three; and a storage operating system is configured to compute a diagonal parity set for the plurality of storage devices, and to store the diagonal parity set on an additional diagonal parity device, the diagonal parity device separate from the plurality of storage devices, where the plurality of storage devices combine with the separate diagonal parity device to form the storage array.

24. The system as in claim 23, further comprising: the plurality of storage devices configured with a predetermined number of storage devices in the storage array as n, where n is p+1, and where p is the prime number, and the one is for the additional diagonal parity device.

25. The system as in claim 23, wherein a single storage device of the plurality of storage devices, where the single storage device is configured to store row parity blocks.

26. The system as in claim 23, further comprising: the plurality of storage devices configured so that not all storage devices are present, and treating absent data storage devices as containing zero valued data.

27. The system as in claim 23, further comprising: the storage operating system to compute row parity blocks by an encoding of data blocks that is tolerant of single device failures.

28. The system as in claim 23, further comprising: the storage operating system to configure each row to have one row parity block and one diagonal parity block.

29. The system as in claim 23, further comprising: the storage operating system to place parity blocks in different locations in different stripes from device to device.

30. The system as in claim 23, further comprising: the storage operating system to implement a row-diagonal (R-D) parity technique that computes the diagonal parity along diagonal parity sets that span the plurality of storage devices, and that stores the diagonal parity for all of the diagonal parity sets except one on the diagonal parity device.

31. The system as in claim 23, further comprising: the storage operating system to invoke storage access operations to and from the array in accordance with a R-D parity technique.

32. The system as in claim 23, further comprising: the storage operating system to configure the array as a RAID system of computer storage units.

33. The system as in claim 23, further comprising: the storage operating system to configure the array as a RAID system of computer storage disks, organizes each computer storage disk into blocks, and organizes the blocks into stripes, the stripes extending across a plurality of the computer storage disks.

34. A computer readable media, comprising: said computer readable media having instructions written thereon for execution on a processor for the practice of enabling recovery from concurrent failure of two storage devices in a storage array comprising, storing data and row parity on a plurality of storage devices, the data configured as rows of blocks on the plurality of storage devices, where a number of the plurality storage devices is equal to a prime number greater then three; computing a diagonal parity set for the plurality of storage devices; and storing the diagonal parity set on an additional diagonal parity device, the diagonal parity device separate from the plurality of storage devices, where the plurality of storage devices combine with the separate diagonal parity device to form the storage array.

35. A method for enabling recovery from concurrent failure of two storage devices in a storage array, comprising: configuring a plurality of storage devices with data and row parity stored in a stripe across the plurality of storage devices with one block stored on each storage device of the plurality of storage devices of each row of the stripe; configuring an additional storage device with diagonal parity, a diagonal parity storage device; determining that two storage devices of the plurality of storage devices have failed resulting in missing blocks; reconstructing a first missing block using diagonal parity, where the first missing block is within a diagonal with only one missing block; and reconstructing other missing block in same row as the first missing block.

36. The method of claim 35, further comprising:
reconstructing a next missing block using diagonal parity, where the next missing block is within a next diagonal with only one missing block;
reconstructing other missing block in same row as the next missing block; and
repeating above steps for any remaining missing blocks.

37. The method of claim 35, wherein a total number of storage devices used in the storage array includes both the plurality of storage devices and the diagonal parity storage device, where the total number of devices (n) is equal to one plus a prime number (p) greater then three.

38. The method of claim 37, wherein each stripe has n−2 rows of blocks.

39. The method of claim 35, further comprising:
placing row parity blocks in different devices in different stripes across the plurality of storage devices.

40. The method of claim 35, further comprising:
implementing a row-diagonal (R-D) parity technique that computes the diagonal parity along diagonal parity sets that span the first storage devices, and that stores the diagonal parity for all of the diagonal parity sets except one on the diagonal parity device.

41. The method of claim 35, further comprising:
storing row parity blocks for the stripe on a single disk of the plurality of storage devices.

* * * * *